(12) United States Patent
Strathmeyer et al.

(10) Patent No.: US 7,072,308 B2
(45) Date of Patent: *Jul. 4, 2006

(54) APPARATUS AND METHOD FOR COMPUTER CONTROLLED CALL PROCESSING APPLICATIONS IN PACKET SWITCHED TELEPHONE NETWORKS

(75) Inventors: Carl R. Strathmeyer, Reading, MA (US); Donald Finnie, Reading (GB)

(73) Assignee: Intel Corporation, Santa Clara, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 09/805,501

(22) Filed: Mar. 13, 2001

(65) Prior Publication Data

US 2001/0026548 A1 Oct. 4, 2001

Related U.S. Application Data

(63) Continuation-in-part of application No. 08/955,834, filed on Oct. 21, 1997, now Pat. No. 6,201,805.

(51) Int. Cl.
*H04L 12/56* (2006.01)
*H04L 12/28* (2006.01)

(52) U.S. Cl. .................. 370/259; 370/356; 370/401
(58) Field of Classification Search ........ 370/352–356, 370/493–494, 328, 338, 401, 252–259, 389–390
See application file for complete search history.

(56) References Cited

U.S. PATENT DOCUMENTS

| | | | |
|---|---|---|---|
| 5,724,412 A | 3/1998 | Srinivasan | |
| 5,867,494 A | 2/1999 | Krishnaswamy et al. | |
| 5,905,872 A | 5/1999 | DeSimone et al. | |
| 6,026,087 A | 2/2000 | Mirashrafi et al. | |
| 6,061,365 A * | 5/2000 | Yeung et al. | 370/470 |
| 6,094,479 A * | 7/2000 | Lindeberg et al. | 379/220.01 |
| 6,185,288 B1 * | 2/2001 | Wong | 379/219 |
| 6,199,096 B1 | 3/2001 | Mirashrafi et al. | |
| 6,201,805 B1 * | 3/2001 | Strathmeyer | 370/356 |
| 6,212,192 B1 | 4/2001 | Mirashrafi et al. | |
| 6,229,883 B1 | 5/2001 | Kakizaki et al. | |
| 6,339,593 B1 | 1/2002 | Kikinis | |
| 6,407,996 B1 * | 6/2002 | Witchalls | 370/352 |
| 6,490,275 B1 * | 12/2002 | Sengodan | 370/356 |

(Continued)

FOREIGN PATENT DOCUMENTS

EP 0 843 454 A2 5/1998

(Continued)

OTHER PUBLICATIONS

Programming Internet Telephony Services, by Jonathan Roseberg, Bell Laboratories; Jonathan Lennox and Henning Schulzrinne, Columbia University, 1999 IEEE, pp. 42-49.*

(Continued)

*Primary Examiner*—Zarni Maung
*Assistant Examiner*—Van Nguyen
(74) *Attorney, Agent, or Firm*—Kacvinsky LLC

(57) ABSTRACT

A method is presented comprising transmitting, from an application computer communicably connected to a call controller which is connected to a data network, packetized messages indicative of telephone calls in progress at an endpoint of the data network, or indicative of such endpoint, and transmitting, from the call controller to the application computer, packetized messages indicative of a variety of information contained in, or relevant to, the telephone calls so as to process such information for a variety of applications. Apparatus to implement the method is also presented.

26 Claims, 5 Drawing Sheets

U.S. PATENT DOCUMENTS

| | | |
|---|---|---|
| 6,614,781 B1 | 9/2003 | Elliott et al. |
| 2001/0026548 A1 | 10/2001 | Strathmeyer et al. |
| 2001/0028711 A1 | 10/2001 | Antonucci et al. |
| 2001/0036176 A1 | 11/2001 | Girard |
| 2002/0067816 A1 | 6/2002 | Bushnell |
| 2002/0159574 A1 | 10/2002 | Stogel |
| 2003/0142807 A1 | 7/2003 | Dolan et al. |
| 2003/0147518 A1 | 8/2003 | Albal et al. |
| 2004/0179516 A1 | 9/2004 | Neyman |

FOREIGN PATENT DOCUMENTS

| | | |
|---|---|---|
| EP | 1 113 656 A2 | 7/2001 |
| EP | 1 211 875 A2 | 6/2002 |
| WO | WO 9802999 | 1/1998 |
| WO | WO 00/76158 A1 | 12/2000 |
| WO | WO 00/79756 A2 | 12/2000 |
| WO | WO 01/22720 A2 | 3/2001 |
| WO | WO 01/43379 A1 | 6/2001 |
| WO | WO 01/59987 A2 | 8/2001 |
| WO | WO 01/69899 A2 | 9/2001 |
| WO | WO 01/78358 A2 | 10/2001 |

OTHER PUBLICATIONS

H. Schulzrinne & J. Rosenberg, "Signaling for Internet Telephony," IEEE, 1998, pp. 298-307, USA.

H. Schulzrinne & J. Rosenberg, "The Session Initiation Protocol: Internet-Centric Signaling," IEEE, Oct. 2000, pp. 134-141, USA.

* cited by examiner

APPARATUS AND METHOD FOR COMPUTER CONTROLLED CALL PROCESSING APPLICATIONS IN PACKET SWITCHED TELEPHONE NETWORKS

CROSS-REFERENCE TO RELATED APPLICATIONS

This application is a continuation-in-part application of U.S. patent application Ser. No. 08/955,834, filed on Oct. 21, 1997 now U.S. Pat. No. 6,201,805.

TECHNICAL FIELD

This invention relates to computer telephone integration (CTI) and, more specifically, to an improved method and apparatus for utilizing CTI techniques to process telephone calls using various applications in a packet switched telephone network.

BACKGROUND OF THE INVENTION

Telephony over packet networks, particularly over wide area networks such as the Internet, has received considerable attention in recent months. Specifically, scientists have begun exploring the possibility of sending voice and video information streams over packet switched data networks. The transmission of such information streams over packet switched networks can be more cost efficient than traditional telephony, which requires a dedicated circuit between the calling and called party.

Computer telephone integration has been widely applied to traditional telephony methods and apparatus, but has not as yet been successfully applied to the methods and apparatus used for packet network telephony. This invention specifies novel apparatus and methods, supplementary to known packet network telephony apparatus and methods, which enable CTI capabilities in such an environment, and use them to process telephone calls.

One possible set of methods and apparatus for completing calls over a packet switched network, which calls can handle voice and other information streams, is defined by ITU recommendation H.323. The H.323 standard is available from the International Telecommunication Union, of Geneva, Switzerland, and is hereby incorporated herein by this reference. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals. While all these functions are further defined in the previously incorporated standard, we set forth two examples below.

Bandwidth control provides a protocol by which the gatekeeper allocates a particular amount of network bandwidth to a particular connection. The gatekeeper can be contacted by either the calling or called party in order to change the amount of bandwidth allocated to a particular call.

As another example, the gatekeeper performs zone management. This function, as further defined in the H.323 standard, provides a mechanism for allocating sets of different terminals and other nodes in the network to a particular gateway. The H.323 standard provides a mechanism for dynamically altering the allocation of different network nodes to different gatekeepers.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art, interfaces to the gatekeeper are only defined from other gatekeepers, end points, and other network entities.

SUMMARY OF THE INVENTION

The above and other problems of the prior art are overcome and a technical advance is achieved in accordance with the present invention which relates to a packet network telephony call controller (e.g.; an H.323 gatekeeper) which is arranged to interface with a plurality of external call processing applications programs which may be located on one or more remote computers. In accordance with the teachings of the present invention, a call processing application computer is connected to a call controller computer, via a data network or otherwise, and these two entities exchange messages in the manner specified by the invention. The call controller computer may be located with one of the terminals or may be located on a separate computer.

As well, the processing application computer may be located with the call controller computer, or remote from it.

The call controller computer and applications computer(s) communicate with one another in order to perform various call control and other call processing application functions over the data network and to provide call information and control to a user of the applications computer. As packet switched telephone connections are set up between various terminals or other nodes, the call controller communicates with one or more application computers in order to provide the call information and call control functions required by the computer telephony applications residing on the application computers. Examples of these functions include establishing and tearing down calls, transferring calls, call conferencing, associating the applications computer with one or more specific end points in the call controller zone for monitoring and control, determining the state of calls at a given endpoint, determining the length of calls in progress at a given endpoint, determining the words exchanged in calls in progress at a given endpoint, determining the originating IP address of calls in progress at a given endpoint, routing unanswered new calls terminating at a given endpoint to another endpoint, and various other functions.

For illustrative purposes, the invention will be described using systems based upon the H.323 standard as an example. It is understood that the invention is intended to cover any and all other protocols, now known or to be known in the art, which address packet telephony, such as, for example, ITU H.248, also known as MEGACO, Session Initiation Protocol ("SIP"), and Media Gateway Control Protocol ("MGCP"). These protocols describe equivalent modules which are responsible for call setup, and are thus functionally equivalent, within the context of the invention, to the gatekeeper of H.323. The names of these modules, of course, vary with the given protocol. For example, in SIP the gatekeeper functionality is accomplished by what is termed a "proxy", in MEGACO by a "Media Gateway Controller", and in MGCP by a "softswitch."

DETAIL DESCRIPTION OF THE PREFERRED EMBODIMENT

Figure 1:
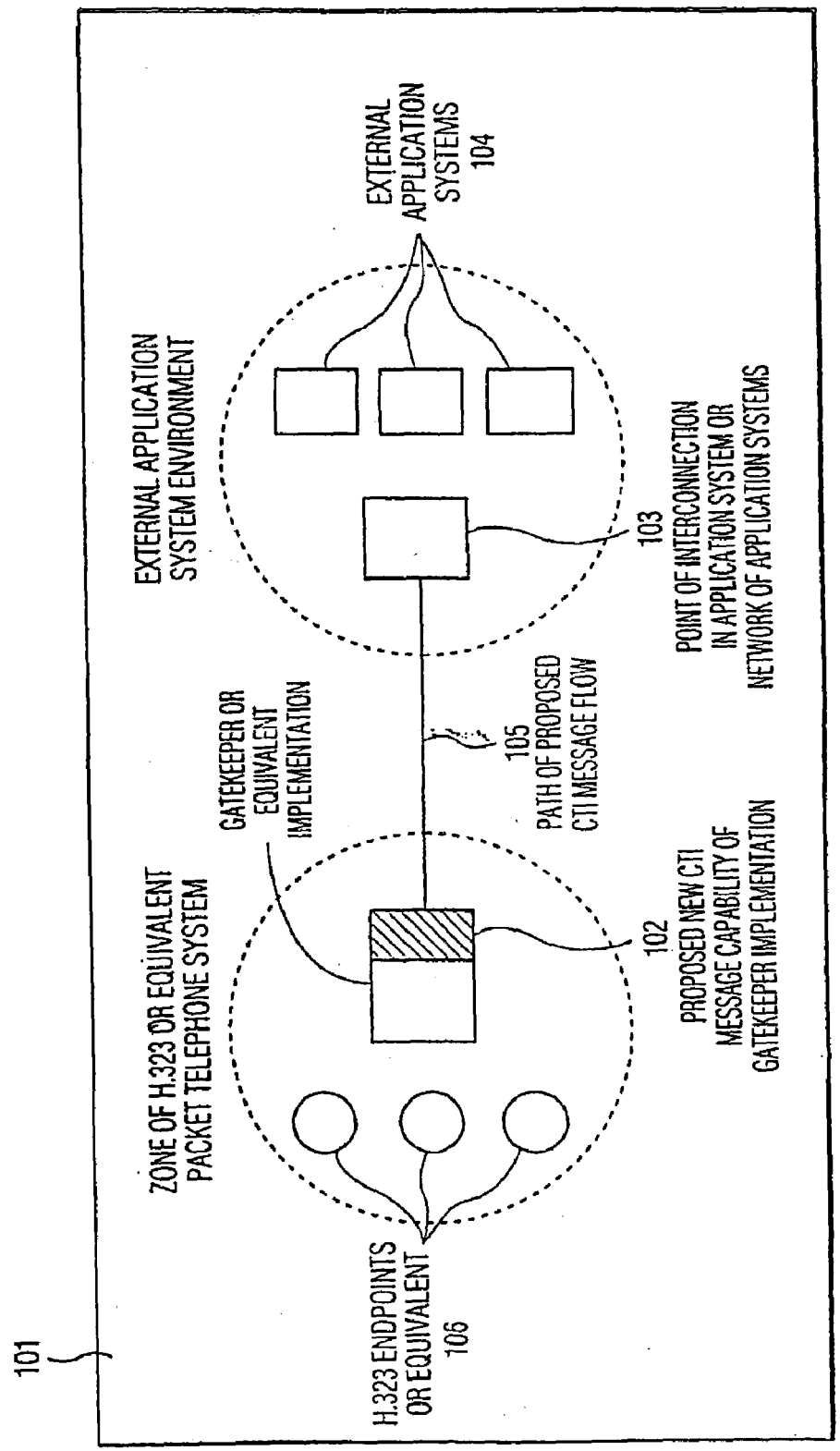
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention. To enable such interconnection, gatekeeper computer 102 is enhanced and extended by the addition of software whose functions are described below. Communications path 105 may be any type of data communications path.

The arrangement of FIG. 1 includes several external telephony applications systems 104, typically implemented as software, which may be located on applications computer 103 or on separate computers connected via any communications network to applications computer 103. Typically, the applications computer may be collocated with one of the end points described below.

The arrangement of FIG. 1 also includes end points 106, which may be personal computers, network computer devices (NCs), or any other node capable of interconnection to the packet network telephony environment.

In operation, a command is issued from an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described, for example, in the incorporated H.323 standard. As a result of this sequence of events, the combined system is able to implement the call processing functionality requested by applications computer 103 on behalf of applications 104.

During operation, various call control functions requested by applications computer 103 are performed by the gatekeeper 102. Additionally, by making appropriate requests of gatekeeper 102, applications computer 103 may monitor the outcome of various call control functions and transmit such outcome to any of applications 104.

Figure 2:
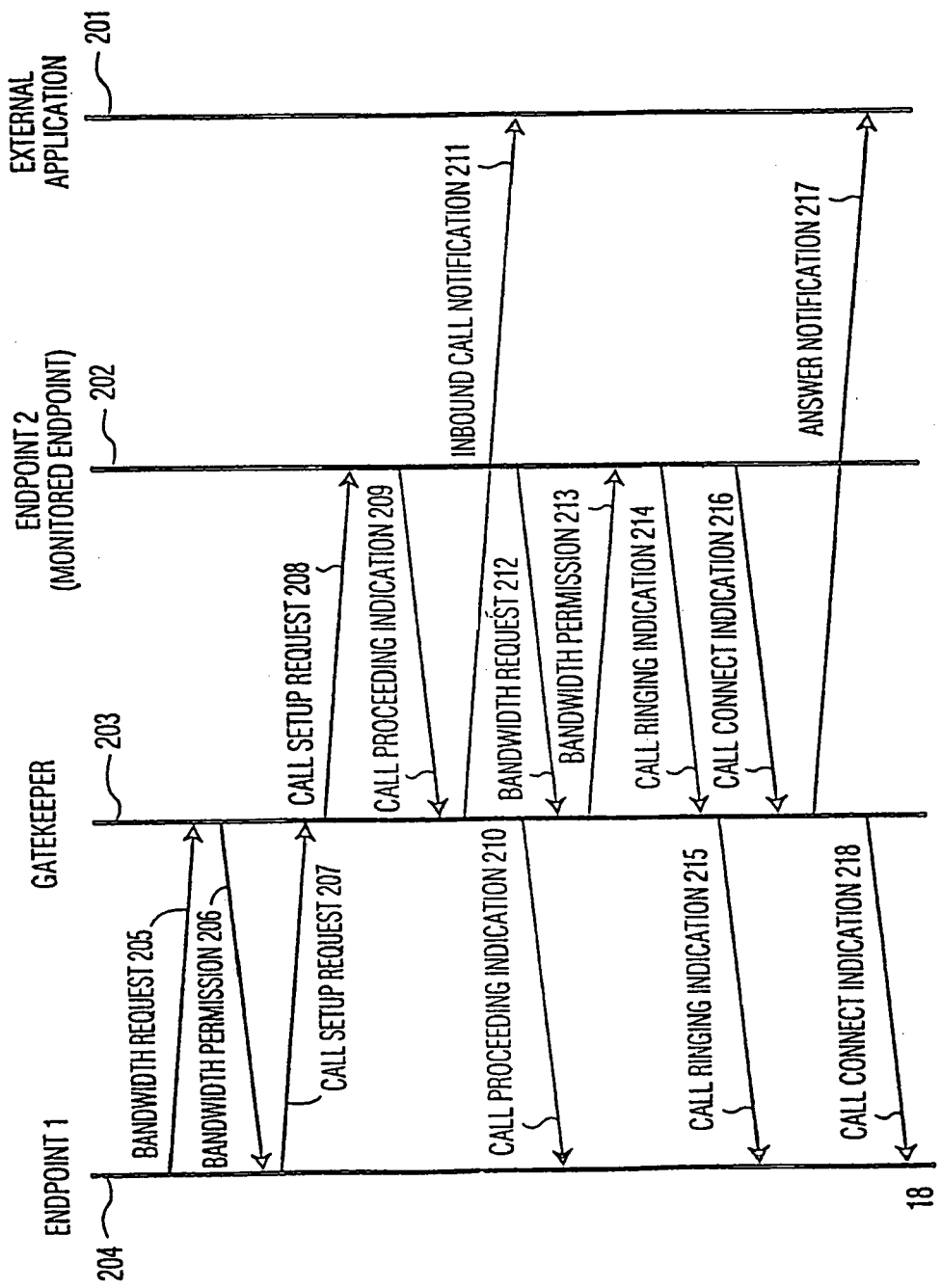
FIG. 2 shows exemplary message flow between system elements during the establishment of an inbound call that is detected by an external software application using the packet network telephony system as enhanced and extended by the present invention.

FIG. 2 shows an exemplary message flow diagram for detecting an inbound call from a remote end point to a local end point supervised by an external computer telephony application using the present invention. The specific example shown in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and the external application 201 may be present on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 207, is issued by the initiating end point 204, and gatekeeper 203 causes call setup request message 208 to be transmitted to receiving end point 202. A call proceeding message 209 is transmitted by the receiving end point back to gatekeeper 203 and relayed to initiating end point 210 as shown.

At approximately the same time gatekeeper 203 relays the call proceeding indication to the initiating end point using message 210, gatekeeper 203 also transmits to external application 201 a notification that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action, end point 202 informs gatekeeper 203 via message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
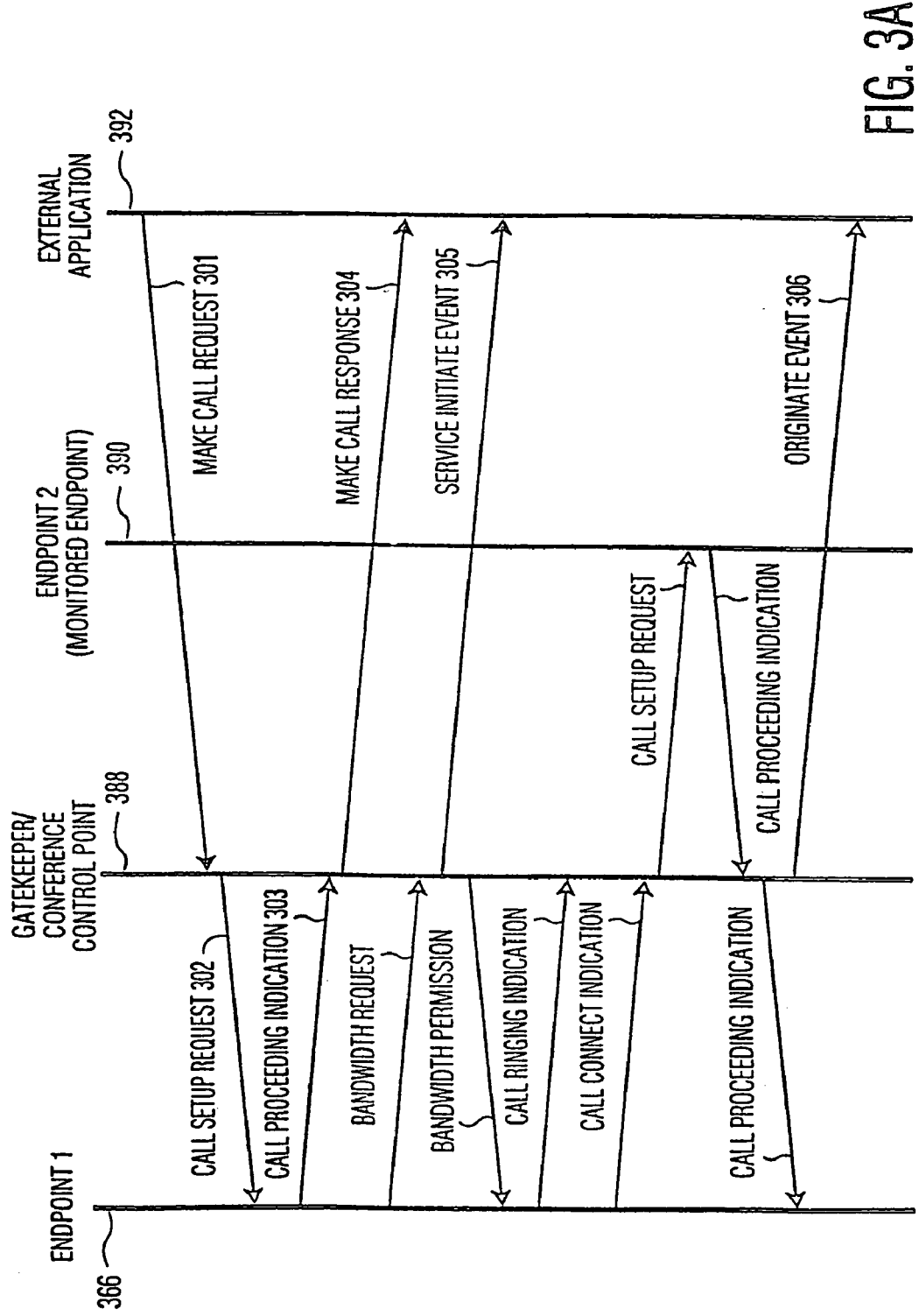
FIG. 3 shows an exemplary message flow diagram utilizing the invention to establish an outbound call requested by an external software application in a similar environment.
Figure 3B:
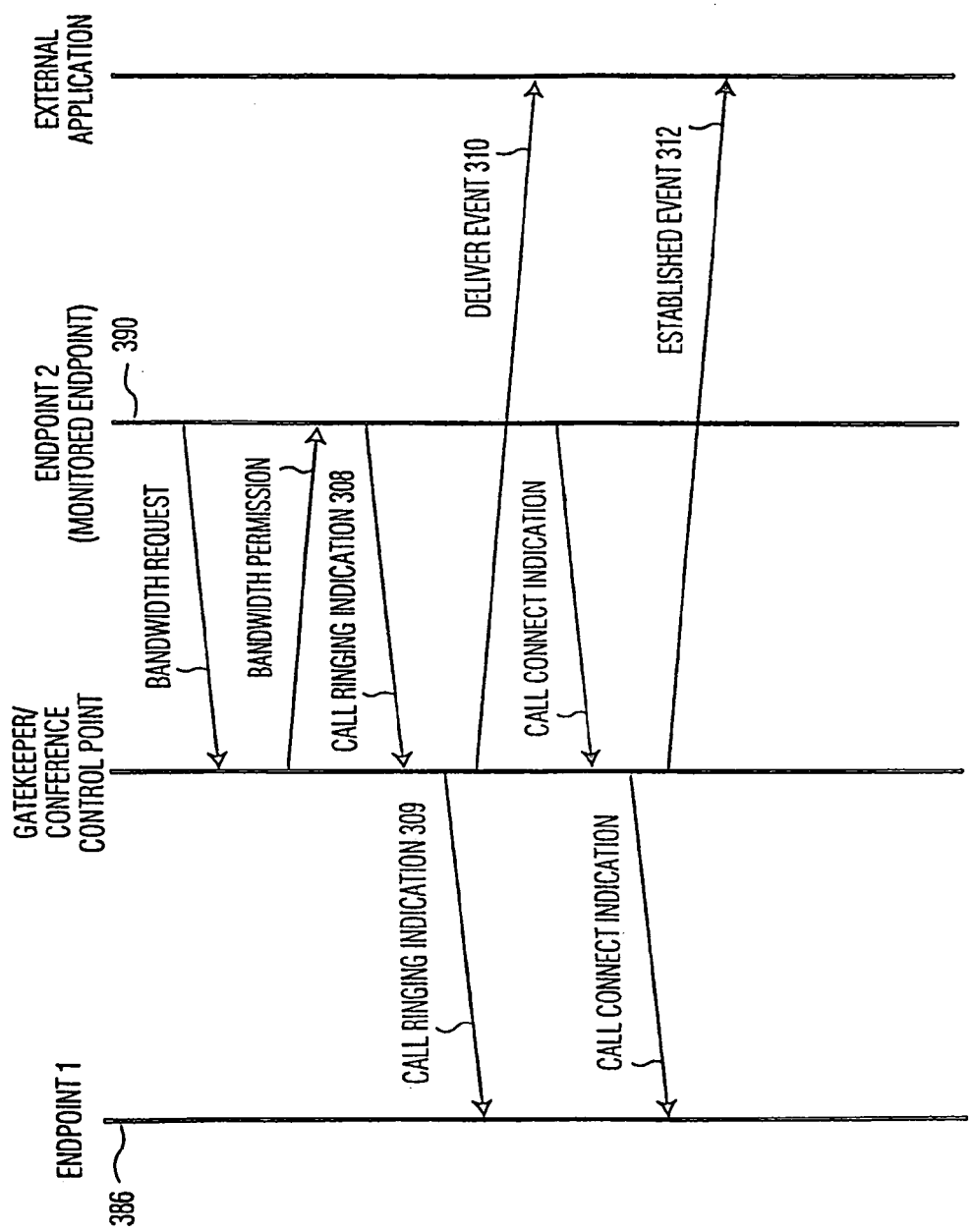

FIGS. 3A and 3B show another example of an external call processing application requesting the establishment of an outbound call from initiating end point 386 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3A and 3B is assumed to have previously communicated with gatekeeper 388 in accordance with other methods described by this invention to indicate its intention to issue call control requests with respect to initiating end point 386.

In FIGS. 3A and 3B, gatekeeper 388 also includes the conference control point function as currently known to the packet network telephony art. This function is used by the invention to interconnect two call segments, namely the segment between the initiating end point 386 and the conference control point; and between the conference control point and the receiving end point 390. The invention connects the call in two stages in order to overcome certain limitations of the known packet network telephony art. For clarity of description, the combined gatekeeper and conference control point apparatus is referred to as a gatekeeper 388.

The sequence of messages begins with a new message 301, specified by the current invention, through which the external application 392 makes a request that the first segment of the call be established from gatekeeper 388 to initiating end point 386.

Next, according to known packet network telephony art, messages 302 and 303 are exchanged between gatekeeper and initiating end point 386 in order to set up that first leg of the call.

Next, the gatekeeper 388 sends a new message 304 to external application 392 to alert it that the call request has been received and is being processed. Much of the remaining signaling, relating to the establishment of that segment of the call between initiating end point 386 and gatekeeper 388 in FIGS. 3a and 3b, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3A and 3B gatekeeper 388 sends new messages to the external application 392 at relevant stages of call processing, including:
1. Message 305 indicating that initiating end point 386 has acquired the necessary network bandwidth to place the call;
2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.

Figure 4:
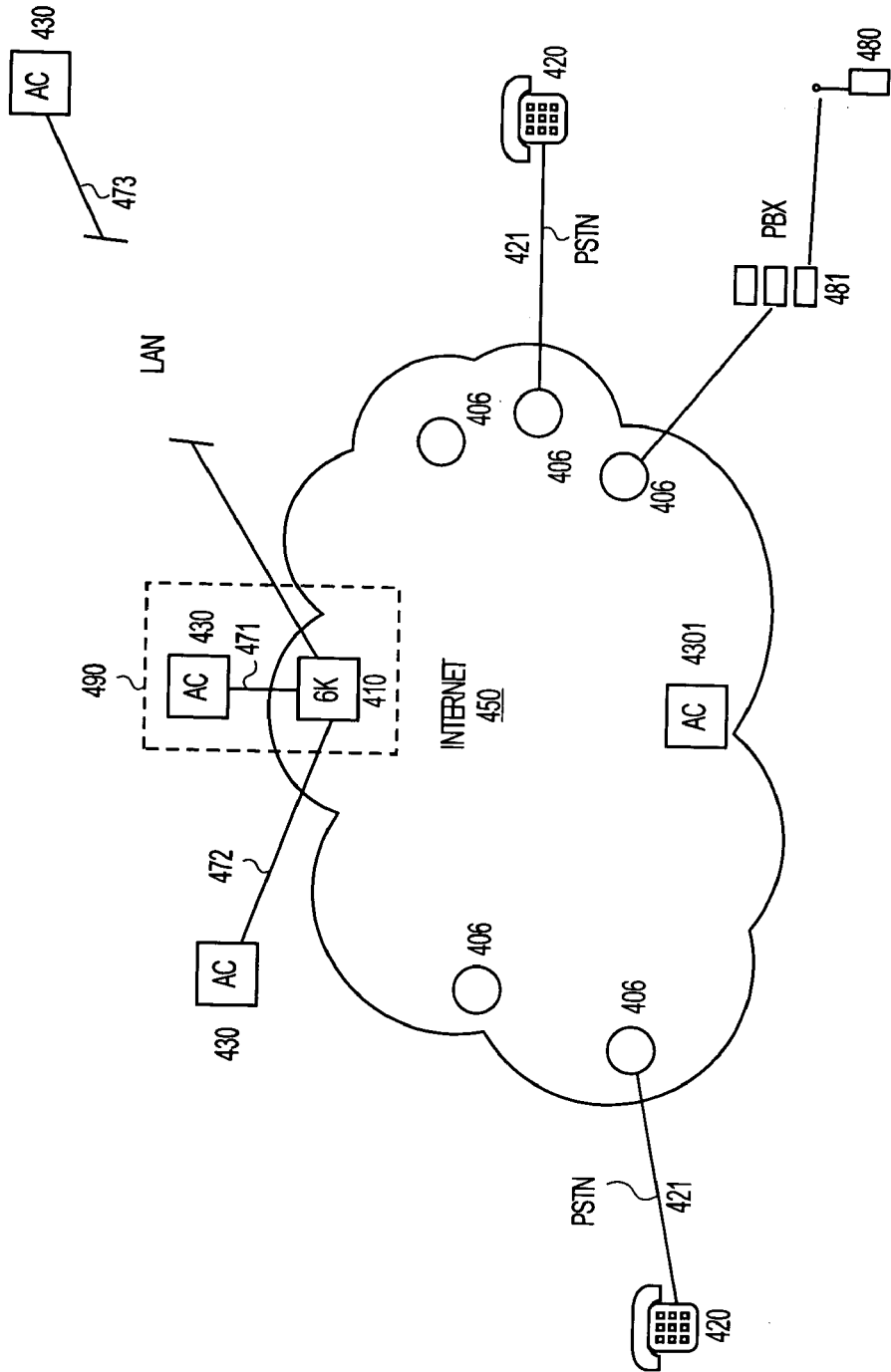
FIG. 4 shows exemplary connections between the gatekeeper computer and processing application computers controlling the gatekeeper computer.

FIG. 4 shows various possible connections for the gatekeeper computer-processing application computer link. A gatekeeper computer 410 facilitates calls between the various H323 or equivalent endpoints 406. As an example, these endpoints can be connected to telephones 420 via PSTNs 421. Alternatively, the endpoints can be connected to other computers or devices, such as PBXs 481, which then interface to, as an example, cellular networks 480.

The processing application computers (AC) 430 are connected to the gatekeeper computer (GK) 410 in a variety of ways, some of which are shown as examples in FIG. 4. The gatekeeper computer sets up and controls call sessions between the various H.323 or equivalent endpoints 406.

One or more ACs 430 can be connected to the GK 410 via a LAN 473, a generic data network 472, or via interprocess software communication 471, where both the GK and AC are software modules on the same physical computing device, shown via the dotted line box 490 drawn around these components connected via the interprocess software communication 471.

Alternatively, the AC 430 and GK 410 can be themselves connected via the Internet 450, or other computer communications network. Or, the GK 410 could write to a file, store, and then itself transmit to an AC 430, via a variety of data transmission channels, as described above, or as is otherwise known in the art.

The ACs 430, communicating with the GK in an analogous fashion as described above, can implement, via a variety of applications programs, applications and services such as voice recognition of the words exchanged in the call, rerouting the call if unanswered after a determined number of rings, measurement of the length of the call, and storing the word content of calls as determined by the above described voice recognizer and writing such content to a file for analysis by another program, to list a few. As described above these applications are usually implemented in software, but could be implemented, wholly or partially, in dedicated hardware as well, especially in complex applications requiring a lot of processing.

The method of the invention relates to software functional modules, and holds constant no matter what the physical arrangement of those modules might be. For example, two modules as described above (for example, the Application Computer and the Gatekeeper) might reside on separate computing systems or may reside on a common system; they nonetheless remain separate modules and communicate with each other in a similar fashion. Thus, the invention is intended to include any such rearrangement of software modules on a convenient set of computing systems.

The communication methods described above are as well intended to include a wide variety of possible implementations. Thus, for example, two modules residing in a common computing system will exchange messages, but may not do so over a physical "data network" in the sense of signals travelling over external wires.

There are various methods by which an application (running on the application system) actually requests the services available over the CSTA-like link (CSTA being the standard abbreviation for Computer Supported Telecommunication Applications). One common method is to provide a standard software library on the application machine that offers a telephony Application Programming Interface ("API") to the application program. Within the context of the invention, this API can be any API that includes call-control functions. Two such APIs known to the industry are, for example, Microsoft's TAPI ("Telephony API") and Sun's JTAPI ("Java Telephony API"). The APIs are used to provide convenient access by the application program to the services delivered by the invention.

There are many possible applications that could make use of the capabilities of the invention. These applications are well known and for the sake of brevity will not be exhaustively described herein. Some of the more likely applications are the following:

Call Routing. When a request to handle an incoming call is presented to the call controller (or "gatekeeper" in H.323 parlance), the gatekeeper sends a message to the application requesting routing instructions. The application uses any convenient business logic to decide how the call should be routed, and responds to the gatekeeper with appropriate instructions. The gatekeeper then routes the call to a destination based on those instructions. Several examples of such business logic would include, as examples, follow me services, load balancing, skill based routing, screen pop, universal queueing and unified messaging, each of which is summarily described in what follows.

Follow-me services. A telephone subscriber leaves forwarding instructions with the application specifying the telephone endpoint or series of endpoints to which calls should be forwarded, and optionally some rules that govern that forwarding. For example, "calls arriving between certain times of day should be forwarded to this number"; or "I am in my car now; send all calls to my cell phone", or "Forward all calls to my voicemail except calls from my boss and my children".

Load balancing. When a call is made to an enterprise and it is determined that any of several individuals, offices or work groups could handle such a call (for example, a call to a customer service number), the application can choose which individual, work group or office should receive the call based on its assessment of the current workload at each potential destination.

Skill-based routing. When a call is made to an enterprise and it is determined that any of several individuals, offices or work groups could handle such a call (for example, a call to a customer service number), the application can choose which individual, work group or office should receive the call based on its assessment of the capabilities required by the caller (for example, knowledge of a particular product or account type, or ability to speak a certain language).

Screen pop. When a call is directed to a particular endpoint, the gatekeeper simultaneously alerts the application so that the application can retrieve business information corresponding to the call (for example, customer or account information) and display it for the user at that endpoint.

Universal Queueing. When an application manages multiple forms of communications for a user (for example, traditional or packet telephone calls, electronic mail messages, facsimile documents, communication requests from parties viewing web pages, text chat sessions) by sequencing those communications so that they are served in an equitable and/or efficient fashion, that application can use the invention to acquire the necessary information about packet telephony calls and to direct the holding and release of such calls as may be required to implement the desired sequencing.

Unified Messaging. When an application manages multiple forms of store-and-forward communications for a user (for example, electronic mail messages, voice mail messages, facsimile documents) by storing these communications, presenting an inventory of those communications to the user, and presenting specific selected messages to the user as directed by that user, that application can use the invention to create packet telephony connections between the message repository and the user for the purposes of presenting said inventory to the user, allowing the user to give said direction, and presenting the selected messages.

The above describes the preferred embodiments of the invention. It will be appreciated however that various other modifications or additions will be apparent to those of ordinary skill in the art.

What is claimed is:

1. A method comprising:
   transmitting, from an application computer arranged to execute computer telephony applications using call control information and connected to a data network to a gatekeeper connected to said data network, over said data network, packetized messages indicative of telephone calls in progress at an endpoint of said data network, or indicative of said endpoint, said application computer being located separately from said endpoint; and
   transmitting, from said gatekeeper to said application computer over said data network, packetized messages with information associated with said telephone calls, said information indicative of the length of said telephone calls.

2. The method of claim 1, where the information includes the originating IP address of the call.

3. The method of claim 1, where the information includes the words exchanged by parties in the call.

4. A method comprising:
   transmitting, from an application computer arranged to execute computer telephony applications using call control information and connected to a data network to a gatekeeper connected to said data network, over said data network, packetized messages indicative of a telephone call or calls in progress at an endpoint of said data network, or indicative of said endpoint, said application computer being located separately from said endpoint; and
   transmitting, from said gatekeeper to said application computer over said data network, packetized messages indicative of the information associated with, or relevant to, said telephone calls.

5. The method of claim 4, where the information includes the originating IP address of the call.

6. The method of claim 4, where the information includes the words exchanged by parties in the call.

7. A method comprising:
   transmitting, from an application computer arranged to execute computer telephony applications using call control information and communicably connected to a gatekeeper which is connected to a data network, packetized messages indicative of telephone calls in progress at an endpoint of said data network, or indicative of said endpoint; and
   transmitting, from said gatekeeper to said application computer, packetized messages indicative of the information associated with or contained in said telephone calls.

8. The method of claim 7, where the information includes the originating IP address of the call.

9. The method of claim 7, where the information includes the words exchanged by parties in the call.

10. A method comprising:
    transmitting, from an application computer arranged to execute computer telephony applications using call control information and connected to a data network to a call controller connected to said data network, over said data network, packetized messages indicative of telephone calls in progress at an endpoint of said network, or indicative of said endpoint, said application computer being located separately from said endpoint; and
    transmitting, from said call controller to said application computer over said data network, packetized messages with information associated with said telephone calls, said information indicative of the length of said telephone calls.

11. The method of claim 10, where the information includes the originating IP address of the call.

12. The method of claim 10, where the information includes the words exchanged by parties in the call.

13. A method comprising:
    transmitting, from an application computer arranged to execute computer telephony applications using call control information and connected to a data network to a call controller connected to said data network, over said data network, packetized messages indicative of telephone calls in progress at an endpoint of said data network, or indicative of said endpoint, said application computer being located separately from said endpoint; and
    transmitting, from said call controller to said application computer over said data network, packetized messages indicative of the information associated with or contained in said telephone calls.

14. The method of claim 13, where the information includes the originating IP address of the call.

15. The method of claim 13, wherein the information includes the words exchanged in the call.

16. A method comprising:
   transmitting, from an application computer arranged to execute computer telephony applications using call control information and communicably connected to a call controller which is connected to a data network, packetized messages indicative of telephone calls in progress at an endpoint of said data network, or indicative of said endpoint; and
   transmitting, from said call controller to said application computer, packetized messages indicative of the information contained in, or associated with, said telephone call.

17. The method of claim 16, where the information includes the originating IP address of the call.

18. The method of claim 16, where the information includes the words exchanged by parties in the call.

19. An article comprising a computer readable medium having instructions stored thereon which when executed causes:
   transmission of, from an application computer arranged to execute computer telephony applications using call control information and communicably connected to a call controller which is connected to a data network, packetized messages indicative of telephone calls in progress at an endpoint of said data network, or indicative of said endpoint; and
   transmission of, from said call controller to said application computer, packetized messages indicative of the information contained in, or associated with, said telephone calls.

20. Apparatus, comprising:
   a call controller, able to allocate resources in a data network;
   at least two endpoints in said data network between which packetized telephone calls can take place; and
   an application computer arranged to execute computer telephony applications using call control information, communicably connected to said call controller, capable of issuing instructions to, and receiving information from, said call controller, indicative of information contained in and relating to said packetized telephone calls or relating to said endpoints.

21. The method of claim 16, where the information includes a length for said telephone calls.

22. The article of claim 19, wherein the information includes a length for said telephone calls.

23. The article of claim 19, where the information includes the originating IP address of the call.

24. The article of claim 19, where the information includes the words exchanged by parties in the call.

25. The apparatus of claim 20, wherein said call controller is configured to operate in accordance with at least one of a list of protocols comprising MEGACO, Session Initiation Protocol, Media Gateway Control Protocol, and H.323 protocol.

26. The apparatus of claim 20, wherein said call controller and said application computer further comprise a telephony application programming interface to identify said information communicated between said call controller and said application computer.

* * * * *

UNITED STATES PATENT AND TRADEMARK OFFICE
CERTIFICATE OF CORRECTION

PATENT NO. : 7,072,308 B2 Page 1 of 1
APPLICATION NO. : 09/805501
DATED : July 4, 2006
INVENTOR(S) : Strathmeyer et al.

It is certified that error appears in the above-identified patent and that said Letters Patent is hereby corrected as shown below:

On the Title page, item (56), under "Other Publications", in column 2, line 2, delete "Roseberg," and insert -- Rosenberg, --, therefor.

In column 9, line 14, in Claim 16, delete "call." and insert -- calls. --, therefor.

Signed and Sealed this

Sixteenth Day of October, 2007

JON W. DUDAS
*Director of the United States Patent and Trademark Office*